May 6, 1952 H. G. LEWIS 2,595,398
COAL CUTTING AND LOADING MACHINE
Filed July 22, 1949 3 Sheets-Sheet 1
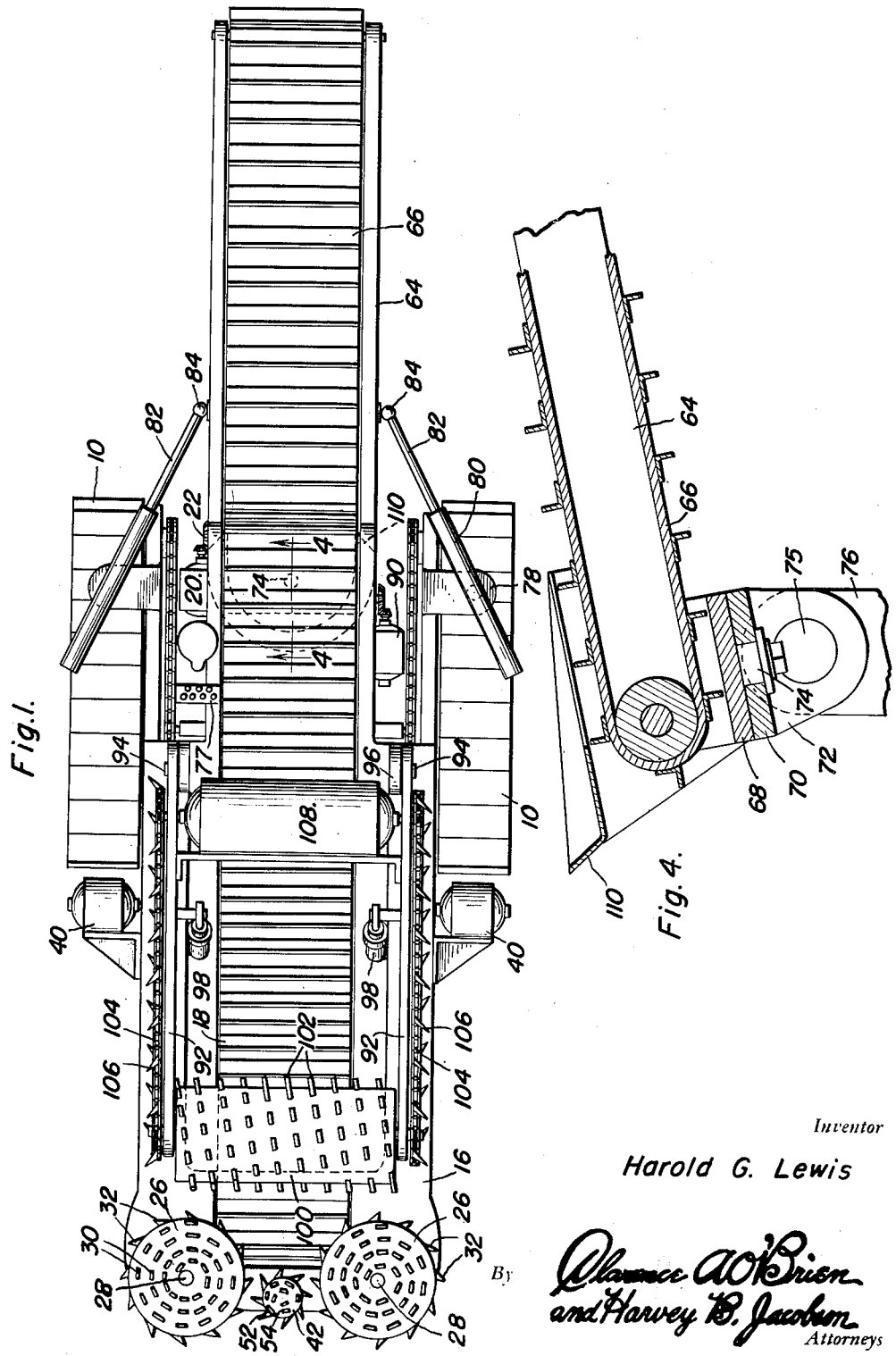
Inventor
Harold G. Lewis

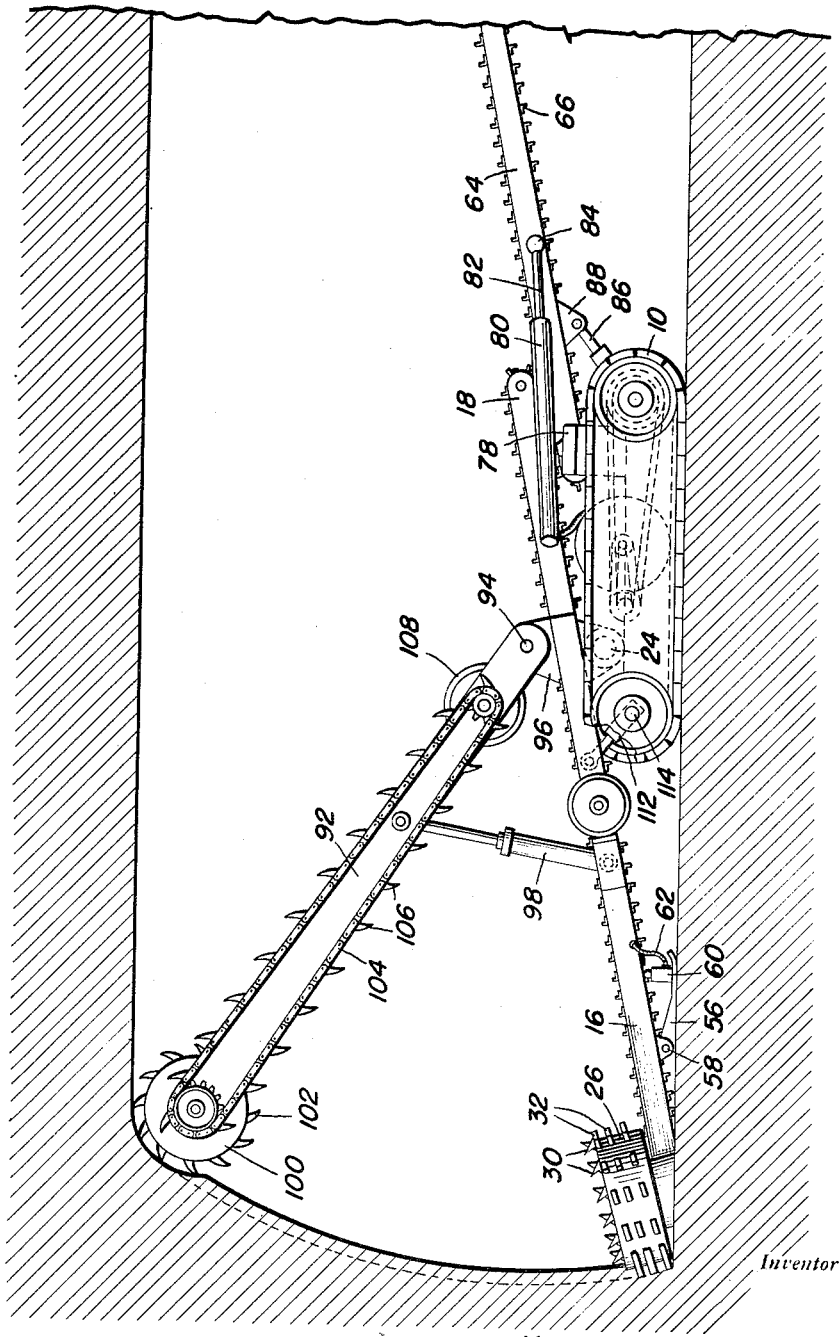

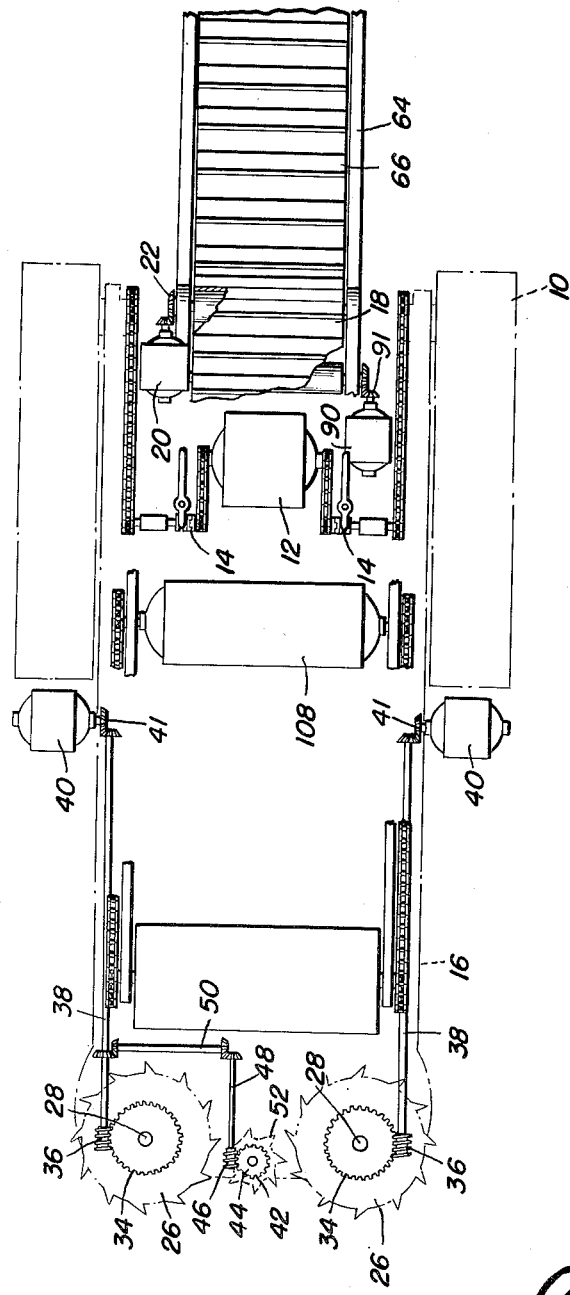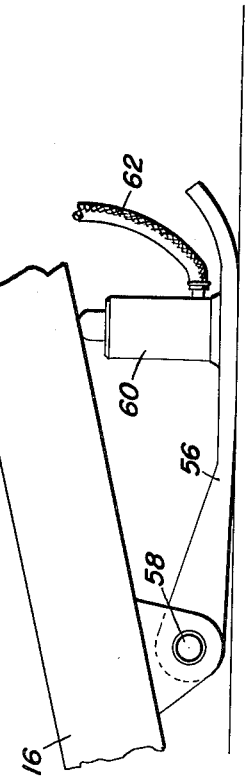

Patented May 6, 1952

2,595,398

UNITED STATES PATENT OFFICE 2,595,398

COAL CUTTING AND LOADING MACHINE

Harold G. Lewis, Peytona, W. Va., assignor of thirty-three and one-third per cent to Jesse C. Clendenin and thirty-three and one-third per cent to Aubrey I. Clendenin, both of Peytona, W. Va.

Application July 22, 1949, Serial No. 106,163

5 Claims. (Cl. 262—9)

This invention relates generally to a coal cutting and loading machine and more particularly to a machine which is self-propelling and provided with rotary cutters adjustably mounted on the forward end of the machine, and with conveyors designed to carry coal toward the rear of the machine where a loading conveyor receives the coal and loads the same into mine cars or pan conveyors.

The primary object of this invention is to expedite and facilitate the cutting of coal and the delivery of the coal rearwardly of the cutting machine, so that the cutting and loading may be continuous.

Another object of this invention is to provide a machine which, although self-propelling, is capable of advancing a considerable distance into a face without any reverse movement, the different elements of the machine being arranged so that the cutters clear a path for the other portions of the machine, as, for example, the pivoted arm structure on the machine has laterally disposed endless chain drives which are provided with laterally projecting teeth to assure that ample clearance for the fore part of the machine will be maintained as the machine cuts its way into the coal face.

Still another object of this invention of a specific nature is to provide an improved loading conveyor structure which is capable of movement in more than one plane, to facilitate shifting of this loading conveyor into proper relationship with mine cars and pan conveyors, and the like, during the continuous operation of the machine.

Still another specific object of this invention is to provide improved cutter construction and arrangement, and controls.

And a last object to be mentioned specifically is to provide a coal cutting and loading machine which is relatively inexpensive and practicable to manufacture, which is safe, simple and convenient to use, and which will give generally efficient and durable service.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 1 is a plan view of the assembled machine;

Figure 2 is a side elevational view of the assembled machine;

Figure 3 is a diagrammatic view of the various elements of the machine, the parts being shown fragmentarily and diagrammatically and the figure being designed to indicate the drive means for the various elements of the machine;

Figure 4 is an enlarged vertical sectional view, taken substantially on the line 4—4, the figure being designed to show the universal mounting of the loading conveyor; and Figure 5 is an enlarged side elevational view, of fragmentary character, showing the skids used to raise and lower the frame of the machine.

Similar characters of reference designate similar or identical elements and portions throughout the specification and throughout the different views in the drawings.

Referring now to the drawings in detail, this invention includes a locomotive truck having endless tracks 10, this motorized truck being of any suitable character, although the truck will ordinarily be motorized by a large electric motor 12 having chain drive connections and clutch mechanism generally indicated at 14, allowing for the directional guiding of the machine.

A frame 16 extends from a rear portion of the machine, over the top of the truck and forwardly of the truck and this frame carries a conveyor 18 which is coextensive in length with the frame, this conveyor being powered by an electric motor 20 and driving connections including bevel gears 22. The frame 16 is pivoted, as indicated at 24 in Figure 2, upon the truck, for pivotal action about a horizontal axis, and the frame and conveyor carried thereby incline downwardly toward the front of the machine. At the forward end of the frame 16 a pair of cutters 26 are mounted, the cutters being rotary and the drive shafts therefor being normal to the frame 16. These drive shafts are indicated at 28, and each cutter 26 has a plurality of inclined teeth 30 on the top portion thereof as well as inclined teeth 32 disposed circumferentially of the cylindrical body portions of the cutters. The cutters have gear wheels 34 secured on their under surfaces, these gear wheels being of a diameter considerably less than the diameter of the cutters, and worms 36 on shafts 38 extending longitudinally of the frame 16, drive said gear wheels 34 so as to provide for individual powering of the cutters 26 by a pair of electric motors 40 driving said shafts 38 through bevel gearing 41. A somewhat similar but smaller center cutter 42 is mounted between the cutters 26 and disposed similarly thereto, this center cutter having a drive gear wheel 44 engaged by a worm 46 on a shaft 48 driven by a jack shaft 50, from one of the shafts 38. The center cutter 42 has circumferentially disposed teeth 62 and inclined teeth 54 on the upper surface thereof. In this connection, it may be noted that the center cutter is displaced rearwardly slightly from the cutters 26, and that the cutters 26 extend laterally slightly beyond the edges of the frame 16 so as to assure ample lateral clearance for the machine. A very important feature of this invention is the arrangement of the cutters and inclined frame 16 in a manner best illustrated in Figure 2, so that the leading edge and cutting edge of each of the cutters extend below the level of the forward edge of the frame 16, so that vertical clearance for the machine is assured.

The frame 16 is tilted as desired by the operator within comparatively small limits by means of a mine floor contacting skid 56 which is pivoted, as indicated at 58, upon a lower forward portion of the frame 16, and a jack 60 is connected by means diagrammatically indicated at 62 with a source of hydraulic pressure, thought unnecessary to be illustrated in these drawings.

A loading conveyor boom 64, with its endless conveyor 66, is mounted for pivotal movement in horizontal as well as vertical planes, by means of a turntable plate 68 on the forward end of the boom 64 and a coacting turntable plate 70 secured on depending ears 72 and apertured to receive a pivot pin 74 carried by the plate 68. The ears 72 are pivoted on horizontal axis pins 75 carried by upstanding members 76 of the truck, and it will be understood that this construction allows the boom 64 and the conveyor 66 to be shifted about both horizontal and vertical axes.

A control panel 77 is mounted on the truck and will be connected by any suitable means with the jack structure now to be described and used for controlling the shifting of the boom 64. Laterally extending support members 78 having pivotally mounted thereon a pair of oppositely disposed jack cylinders 80 with piston rods 82 connected by universal joints 84 with the sides of the boom 64, and this structure allows for the shifting of the boom about a vertical axis pin 74 mentioned above. The vertical pivotal action of the boom 64 is accomplished by means of a jack 86 pivoted to the truck and to the lower portion of the boom 64, as indicated at 88 in Figure 2.

The loading conveyor 66 is powered by an electric motor 90 and driving connections designated, as a unit, by the numeral 91. Pivoted arm structure comprising a pair of oppositely disposed arms 92 are mounted, as indicated at 94, upon the portion of the frame 16 disposed above the truck, these arms extending forwardly and upwardly from their points of connection on the machine and being raised by jacks 98. A transversely disposed cutter 100, having cutting teeth 102 on the circumference thereof, is operatively mounted to and between the upper ends of the arms 92, and the preferred means of powering the cutter 100 comprises a pair of endless chains 104, having laterally disposed cutting teeth 106, together with the necessary complement of sprocket wheels and a motor 108, the teeth 106 assuring that the channel cut by the machine will be sufficiently wide to assure ample clearance for the machine in its further forward and reversing motion.

A hopper 110 is rigidly fixed upon the forward end of the loading conveyor boom 64, to guide the coal from the conveyor 18 onto the loading conveyor 66. Finally, a pair of jacks 112 are provided on opposite sides of the frame 16 and mounted to and between portions of the frame 16 ahead of the pivots 24 and the truck, the Figure 2 showing an embodiment of this feature of the invention wherein the jacks 112 are pivoted on front axle structure 114 of the truck.

The operation of this invention will be clearly understood from a consideration of the foregoing description of the mechanical details thereof, taken in connection with the drawings and with the above recited objects. It will be clear that the cutter 100 can be raised and lowered as the machine is propelled forwardly and that the coal cut by the cutter 100, as well as the coal cut by the cutters 26 and 42, will be carried by the conveyor 18 rearwardly to the loading conveyor 66. The machine will be propelled rearwardly and moved laterally after a cut has been made in order to place the machine for a new cut. Raising and lowering of the cutters 26 and 42, within small limits, will be accomplished by the use of jack 60 during the actual cutting operation. Raising and lowering of the front end of the frame, to a greater extent, as when the machine is to be backed away from the face and replaced, is accomplished by means of the jack 112. Raising of the front end allows the machine to be withdrawn from the face without dragging out loose coal. The machine is also more easily maneuvered when the front end is so raised.

Minor variation from the embodiment disclosed may be made without departing from the spirit of this invention, all within the scope of the appended claims.

Having described the invention, what is claimed as new is:

1. A coal cutting and loading machine comprising a locomotive truck, a frame extending forwardly and pivoted on the truck for movement about a horizontal axis, power driven cutters on the front end of said frame, a front conveyor on said frame to carry coal from said cutters toward the rear of the frame, a loading conveyor boom pivotally mounted on said truck, and a loading conveyor on said boom to receive coal from the rear end of the front conveyor and to carry said coal rearwardly of the truck, said frame and front conveyor being inclined downwardly at the front end of the machine, and said cutters being rotatively mounted on axes normal to the general plane of said frame and having the forward cutting elements of the cutters extending to points beneath the level of the front ends of the frame and front conveyor.

2. A machine according to claim 1 and including a skid on said frame to contact the mine floor, and means to adjust the skid vertically relative to the frame.

3. A machine according to claim 1 and wherein said front cutters have circumferentially disposed teeth and teeth on the tops of the cutters.

4. A coal cutting and loading machine comprising a locomotive truck, a frame extending forwardly of the truck and pivoted on the truck for movement about a horizontal axis, power driven cutters on the front end of said frame, a front conveyor on said frame to carry coal from said cutters toward the rear of the frame, a loading conveyor boom pivotally mounted on said truck, a loading conveyor on said boom to receive coal from the rear end of the front conveyor and to carry said coal rearwardly of the truck, said frame and front conveyor being inclined downwardly at the front of the machine, said cutters being rotatively mounted on axes normal to the said frame and having the forward cutting elements of the cutters extending to points beneath the level of the front ends of the frame and front conveyor, arm structure pivoted on said frame for movement about a horizontal axis and extending forwardly of the truck above the forward portion of the frame, a power driven cutter on the forward end of said arm structure, and means to raise and lower the arm structure pivotally relative to said frame.

5. A coal cutting and loading machine comprising a locomotive truck, a frame extending forwardly and pivoted on the truck for movement about a horizontal axis, power driven cutters on the front end of said frame, a front conveyor on said frame to carry coal from said cutters toward the rear of the frame, a loading conveyor boom pivotally mounted on said truck, a loading conveyor on said boom to receive coal from the rear end of the front conveyor and to carry said coal rearwardly of the truck, said frame and front conveyor being inclined to the horizontal and said cutters being rotatively mounted on axes normal to the said frame and having the forward cutting elements of the cutters extending to points beneath the level of the front ends of the frame and front conveyor, arm structure pivoted on said frame and extending forwardly of the truck above the forward portion of the frame, a power driven cutter on the forward end of said arm structure, and means to raise and lower the arm structure, said arm structure having a motor thereon, endless drive chains operatively connecting said motor with the cutter on the arm structure, said chains extending laterally of the arm structure and having laterally extending cutting teeth.

HAROLD G. LEWIS.

REFERENCES CITED

The following references are of record in the file of this patent:

UNITED STATES PATENTS

| Number | Name | Date |
|---|---|---|
| 1,143,897 | Flexner et al. | June 22, 1915 |
| 1,190,300 | Kuhn | July 11, 1916 |
| 1,226,412 | Thomas | May 15, 1917 |
| 1,811,927 | Halleck | June 30, 1931 |
| 1,903,673 | Hauge | Apr. 11, 1933 |
| 2,066,137 | Cartlidge | Dec. 29, 1936 |
| 2,329,875 | Cartlidge | Sept. 21, 1943 |
| 2,424,180 | Merchant | July 15, 1947 |